United States Patent [19]

Hufnagel

[11] Patent Number: 4,649,617
[45] Date of Patent: Mar. 17, 1987

[54] MACHINE FOR PARTIALLY OR COMPLETELY DISASSEMBLING WOOD PALLETS

[76] Inventor: Paul L. Hufnagel, 3849 S. 99 E. Ave., Tulsa, Okla. 74146

[21] Appl. No.: 744,767

[22] Filed: Jun. 14, 1985

[51] Int. Cl.⁴ ............................................. B23P 19/04
[52] U.S. Cl. .................................... 29/426.4; 29/403.3; 29/239; 29/252; 83/471.2; 83/488; 83/504; 83/508.2
[58] Field of Search ................. 29/239, 426.1, 426.4, 29/564.3, 252, 403.1, 403.3, 426.3, 426.5; 83/483, 485, 487, 488, 498, 504, 508.2, 471.2, 477, 477.1, 477.2, 489, 508.3, 781

[56] References Cited

U.S. PATENT DOCUMENTS

| | | | |
|---|---|---|---|
| 3,869,780 | 3/1975 | Ginnow et al. | 83/477 |
| 4,241,495 | 12/1980 | Wakeem | 29/252 X |
| 4,320,570 | 3/1982 | Williams | 29/564.3 |
| 4,346,506 | 8/1982 | Martindale | 29/252 X |
| 4,418,260 | 11/1983 | Detrick | 29/426.1 X |

Primary Examiner—Gil Weidenfeld
Assistant Examiner—Steven C. Bishop
Attorney, Agent, or Firm—Head, Johnson & Stevenson

[57] ABSTRACT

A machine for disassembling all or a portion of wood pallets formed of paralleled stringers with deck boards, nailed to the top and bottom edges, the machine having a support arm onto which a wood pallet is positioned with a stringer in engagement with the support arm, the deck boards of the pallet extending to either side of the support arm, a carrier arm supported parallel to and spaced from the support arm, a hub slidable on the carrier arm, opposed cutter wheels rotatably supported to the hub, the periphery of the cover wheels being adjacent the opposed sides of the support arm, and a reciprocable cylinder-piston for moving the hub and therefore the cutter wheels to cut the nails holding the pallet deck boards to the stringer positioned on the support arm.

13 Claims, 13 Drawing Figures

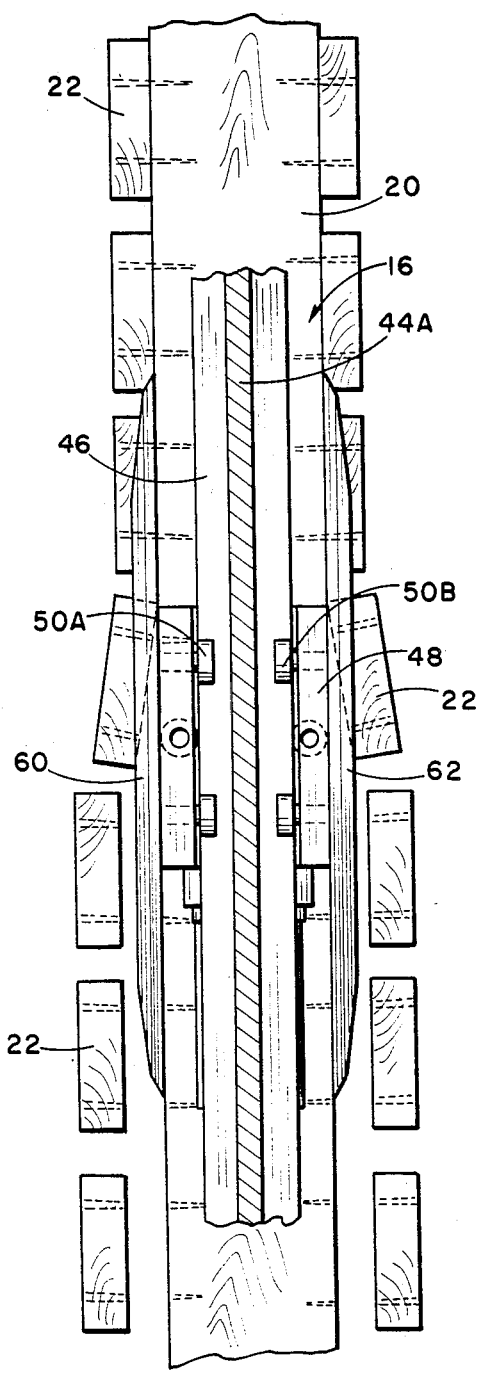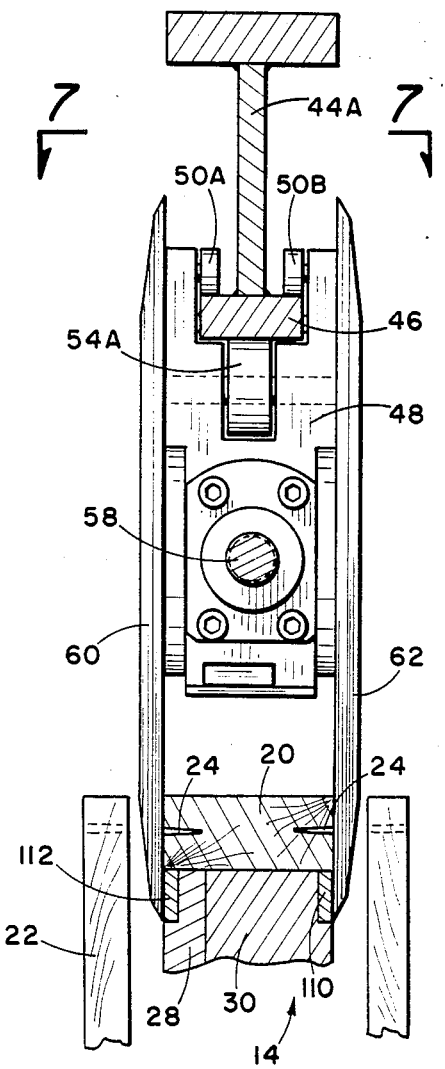
Fig. 7
Fig. 6

MACHINE FOR PARTIALLY OR COMPLETELY DISASSEMBLING WOOD PALLETS

SUMMARY OF THE INVENTION

Wood pallets are commonly employed in industry and the shipping and wholesale business for storing and moving products. The wood pallets provide a base on which products can be positioned and by use of a fork lift, the pallets with materials stored thereon can be speedily moved from one location to another. The pallets further provide means of keeping the products from contact with the floor of the structure in which they are stored. Because of the widespread usage of pallets the business of manufacturing and supplying pallets has become a major industry in the United States and other industrialized nations of the world.

While wood pallets have a rather long length of service they nevertheless are subject to damage and it is necessary to periodically disassemble them so that the materials of which they are made can be employed for making new pallets. A wood pallet typically is formed of three stringers which may be such as 2×4's. The stringers are placed parallel to each other. On one surface of the stringers deck boards are nailed. The deck boards are typically one inch lumber, such as 1×4's, 1×6's, 1×8's, etc. The deck boards are typically nailed to the stringers with small gaps between them so as to provide, when the stringer is assembled, a generally flat, horizontal surface. Deck boards are nailed both to the bottom and top edges of the stringers so that the deck boards on one side function to provide a bottom support surface and the deck boards on the other side of the stringers provide a top, material receiving, surface. Deck boards can become damaged by excess weight or, if the deck boards are formed of material having knots or imperfections therein, weak areas occur in the deck boards and they can become defective so as not to provide a good material receiving surface. Stringers also can become defective so that they are not suficiently strong to support the deck boards and carry the weight of the material stacked on the pallet.

For these reasons it is frequently necessary to scrap a pallet. In doing so, the pallet is disassembled so that reuseable stringers and deck boards can be employed in building new pallets.

The present invention is directed towards a machine for disassemblying wooden pallets. The machine includes an elongated support arm onto which a wood pallet is positioned with a stringer in engagement with the support arm and the deck boards extending to either side of it. The machine is used to disassemble pallets while they are supported in a vertical position.

Since the width of stringers may vary, an important feature of the invention is the provision of means whereby the width of the support arm may be varied so that when a pallet is placed in engagement with the support arm the width of the arm is adjusted to correspond to the width of the stringer contacting the support arm.

An elongated carrier arm is supported parallel to and spaced above the support arm. A hub is slideably supported by the carrier arm and is reciprocally moved by a cylinder-piston, the piston rod being affixed to the hub. Opposed cutter wheels are rotatably supported to the hub. The periphery of the cutter wheels are adjacent the opposed sides of the support arm. In the preferred embodiment wherein the support arm is variable in width, the spacing between the cutter wheels is likewise variable so that as the width of the support arm is varied the spacing between the cutter wheels is simultaneously varied.

The support arm includes block members serving as means to restrain the pallet stringer in engagement with the support arm from laterally shifting.

With a pallet positioned on the support arm the lateral movement of the hub and cutter wheel serve to cut the nails holding the deck boards to the stringers. This operation is repeated for each stringer and thereby the deck boards are separated from the stringer enabling both the stringers and the deck boards to be reused. The operation is carried out very expeditiously and controlled by an operator so that other than the placement of the pallet in proper position on the support arm, all other operations of disassemblying the pallet are carried out automatically.

Others have provided machines for disassemblying wood pallets and for background information reference may be had to the following U.S. Pat. Nos. 4,435,892, 4,241,495, 225,252, 2,652,864, 4,372,174, 4,346,506, 4,152,819, 1,645,924, 3,718,063, 4,467,849, 4,320,570, 3,869,780, 2,593,843 and 4,104,944.

A better understanding of the invention will be had with reference to the following description and claims taken in conjunction with the attached drawings.

DESCRIPTION OF THE DRAWING

FIG. 6 is a cross-sectional view taken along the lines 6—6 of FIG. 5.

FIG. 7 is a top view of portions of the machine shown in FIG. 6 taken along the line 7—7 of FIG. 6 showing the nails holding the pallet deck boards to a stringer being cut.

DESCRIPTION OF THE PREFERRED EMBODIMENT

Figure 1:
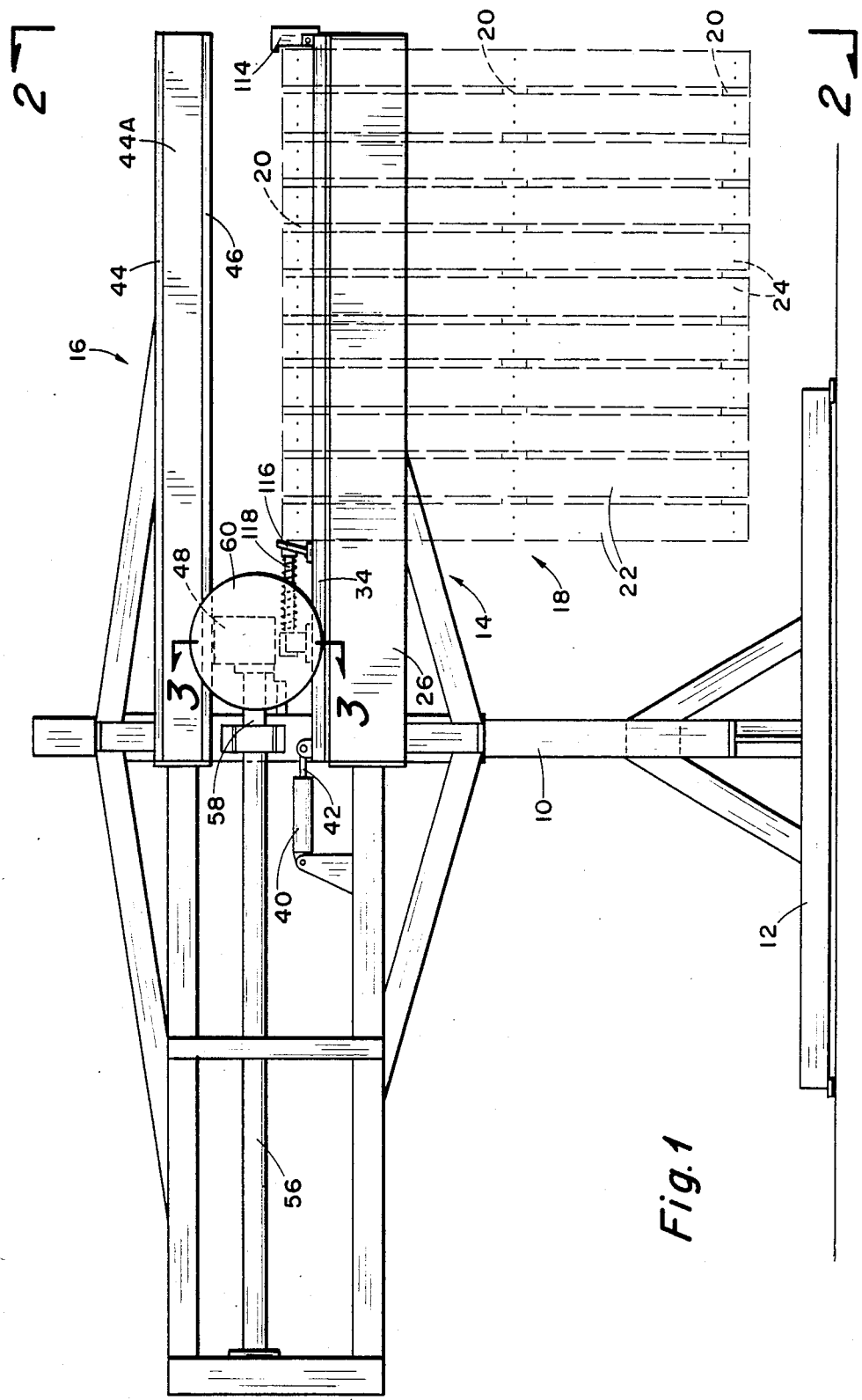
FIG. 1 is an elevational view of a machine for disassemblying wood pallets according to this invention showing a wood pallet in dotted outline positioned on the machine.
Figures 2, 3:
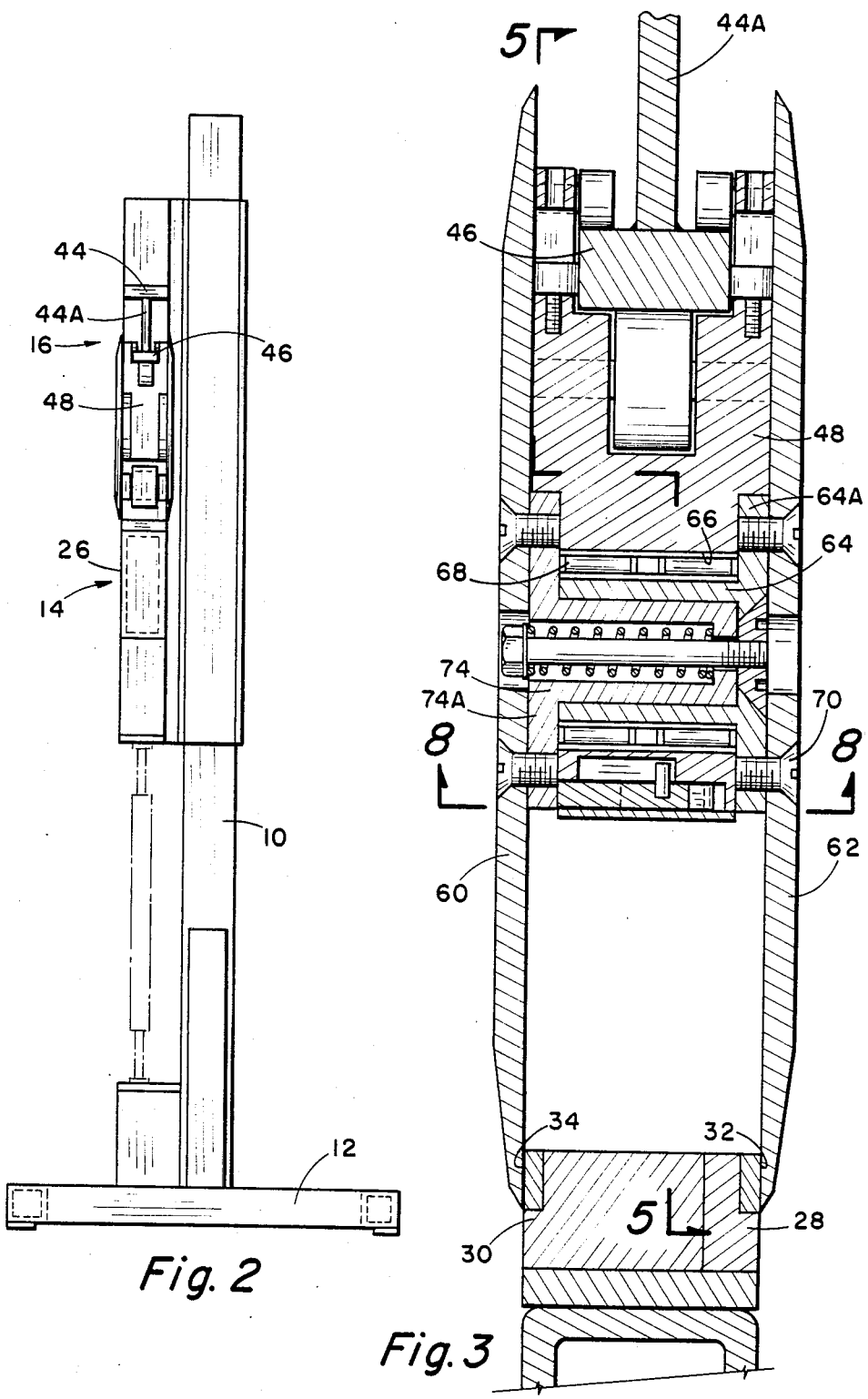
FIG. 2 is an end view taken along the lines 2—2 of FIG. 1.
FIG. 3 is an enlarged cross-sectional view of the support arm, carrier arm, hub and cutter wheels as taken along the line 3—3 of FIG. 1.

Referring to the drawings and first to FIGS. 1, 2 and 3, a machine employing the principles of this invention is illustrated. The machine includes a post member 10 supported on a base 12, the post member being vertical. Extending from the post member is a horizontal elongated support arm generally indicated by the numeral 14 and positioned above the support arm and extending horizontally is a carrier arm 16. The post 10, support arm 14 and carrier arm 16 are in a vertical plane.

The function of the support arm 14 is to receive a wooden pallet thereon, a wooden pallet being indicated in dotted outline in FIG. 1 and generally indicated by numeral 18. The wooden pallet includes stringers 20, usually formed of 2×4's and a typical wooden pallet employs three stringers 20. Affixed to the top and bottom edges of the stringers 20 are deck boards 22. The deck boards are secured to the stringers by means of nails 24. The function of the pallet disassembly machine is to cut the nails 24 so that the deck boards are severed from the stringers permitting both to be reused in fabricating new pallets.

The support arm 14 includes a lower structural member 26 having a width less than the width of the smallest stringer of a pallet to which the machine is designed and the support arm further includes a portion supported by structure 26 which, in the preferred embodiment is of varible width. The variable width portion includes a first elongated portion 28 and a second elongated portion 30. The first support arm portion 28 has an outer edge 32 and, in like manner the second portion of the support arm portion 30, has an outer edge 34. The outer edges 32 and 34 define the width of the support arm and in the use of the machine the support arm is adjusted in width so that the outer edges 32 and 34 engage, or substantially engage, the inner sides of the top and bottom deck boards on a pallet.

Figure 10:
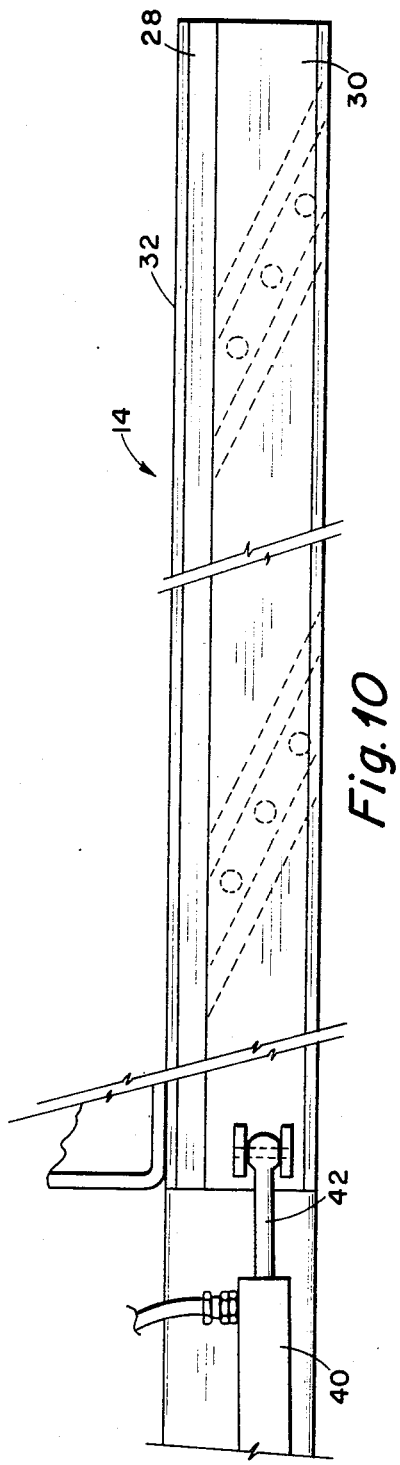
FIG. 10 is a fragmentary top view of the support arm showing the support arm in its position of minimum width.
Figure 11:
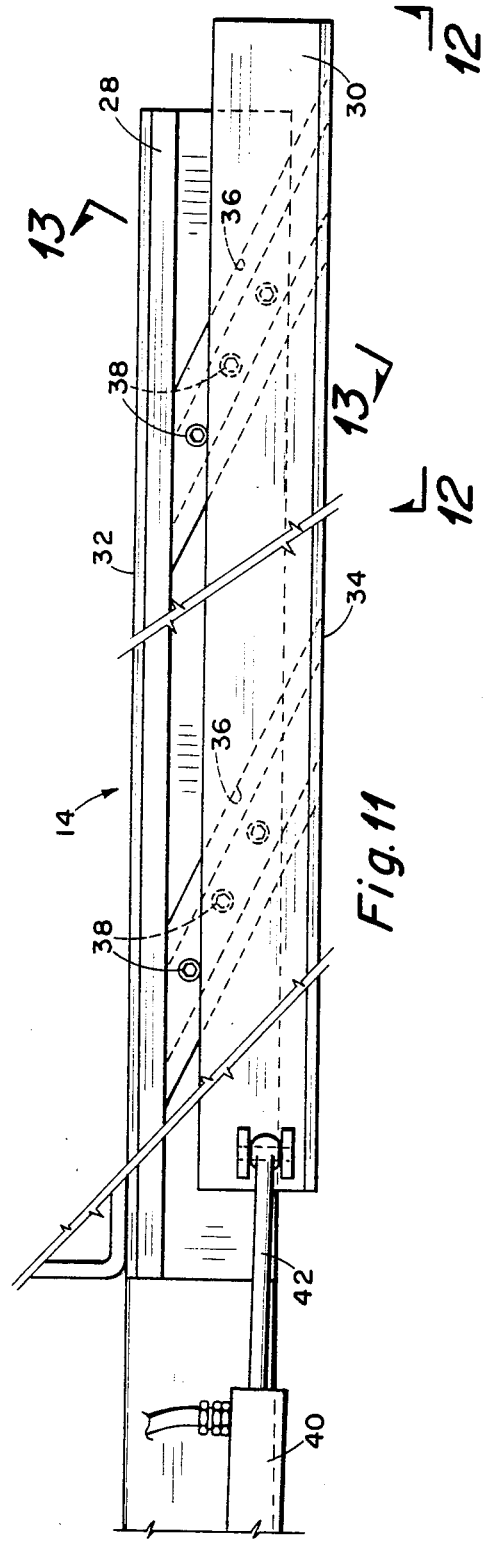
FIG. 11 is a view as in FIG. 10 but showing a support arm expanded to a wider width.
Figure 12:
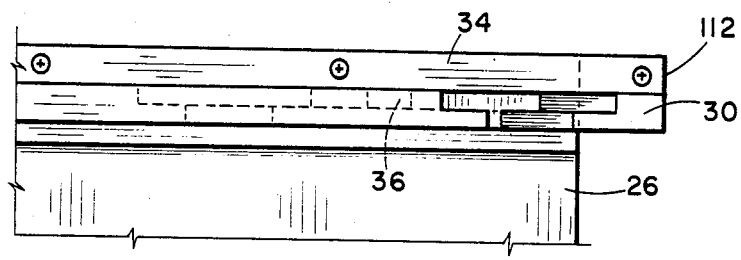
FIG. 12 is a fragmentary side view of portions of the support arm showing the means whereby variable width is attained.
Figure 13:
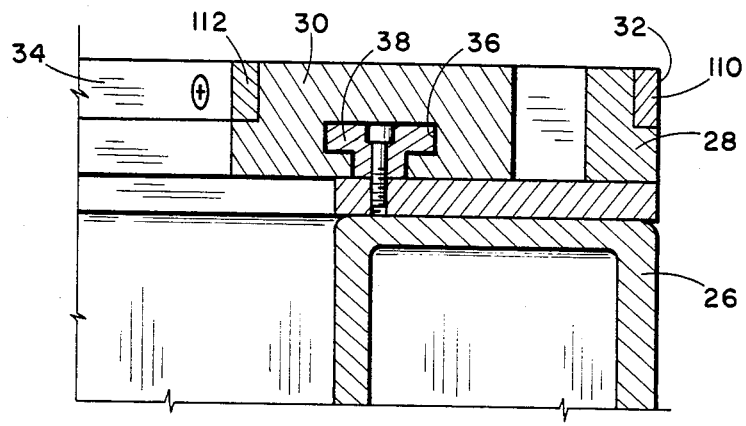
FIG. 13 is a cross-sectional view of the support arm taken along the line 13—13 of FIG. 11.

As shown in FIGS. 10 and 11, the width of the support arm 14 is variable by the longitudinal positioning of the second portion 30 relative to the first portion 28. At least two spaced apart tracks 36 are formed in the bottom surface of the support arm second portion 30, as seen in FIGS. 12 and 13. Affixed to the support arm first portion 28 are a number of rollers 38 which are received in the T-shaped tracks 36. By the employment of the inclined tracks 36 and rollers 38 it can be seen that the width between edges 32 and 34 of this support arm can be varied as the second portion is longitudinally positioned relative to the first portion 28.

To change the spacing a cylinder 40 has a piston rod 42 extending from it. By means of hydraulic pressure the longitudinal position of the support arm second portion 30 can be varied by extending or retracting the piston rod 42 so that the operator can adjust the width of the support arm to conform to the width of the stringer of the wooden pallet positioned on the support arm.

Figure 4:
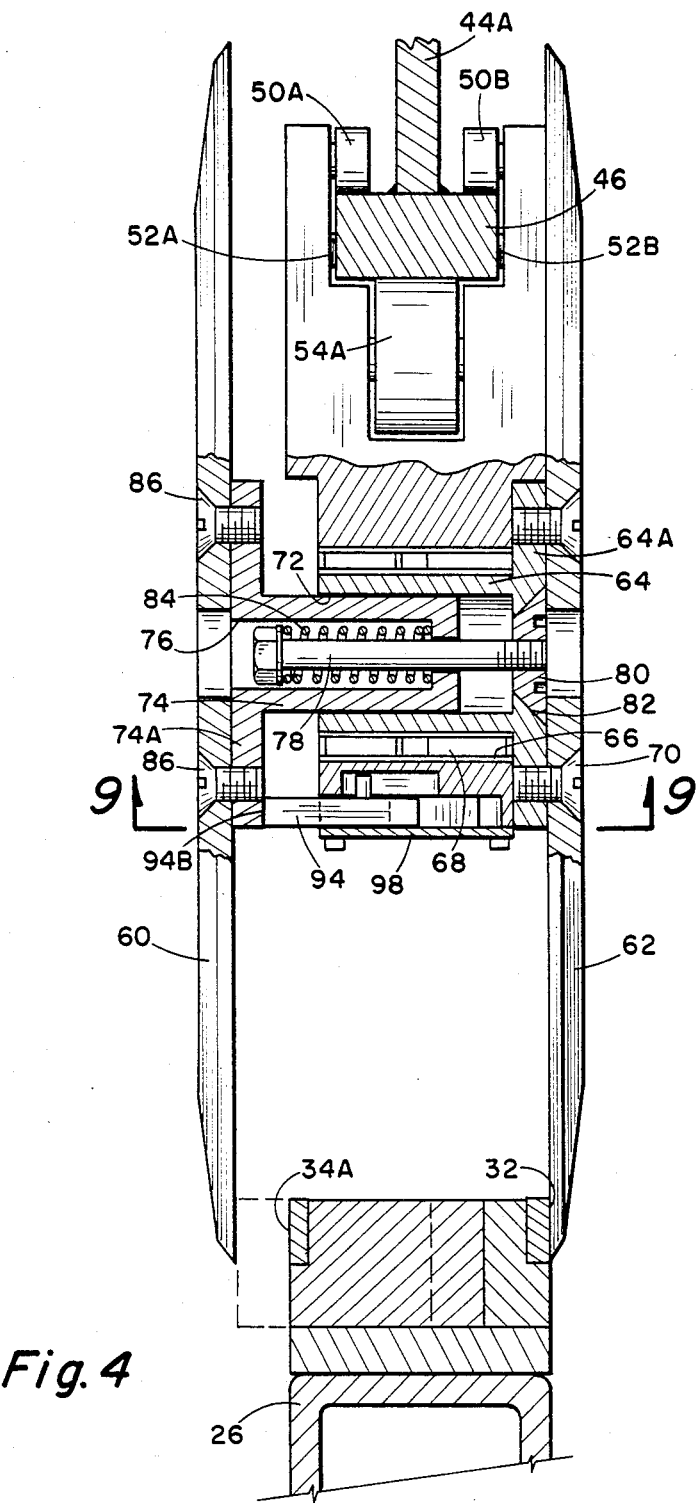
FIG. 4 is a view as in FIG. 3 but showing the cutter wheels in an expanded position to accept a wider stringer.

The cross-sectional configuration of the carrier arm is shown in FIGS. 2, 3 and 4. The carrier arm includes a T-shaped structural member 44 having a vertically extending web portion 44A. Affixed to the lower horizontal edge of the web portion 44A is a race member 46 of square cross-sectional configuration providing upper, lower and first and second side smooth rolling surfaces.

A hub 48 is supported by the race member 46. The hub 48 has upper rollers 50A and 50B, side rollers 52A and 52B and bottom rollers 54A and 54B (See FIG. 5). By means of a cylinder 56 (See FIG. 1) having a piston rod 58 reciprocably extending therefrom, the hub 48 is reciprocated along the length of the carrier arm 16.

The function of hub 48 is to carry cutter wheels 60 and 62. In order to accommodate pallets having varying width stringers the spacing between cutter wheels 60 and 62 must be variable. FIGS. 3 and 4 show the arrangement by which the variable spacing between the cutter wheels is accomplished. Cutter wheel 62 has a hub formed of a cylindrical portion 64 and an integral flange portion 64A. The hub 64 is rotatably received in an opening 66 formed in the hub carrier 48. By means of bearing 68 hub 64 is rotated with respect to the hub carrier. Hub wheel 62 is secured to the integral flange portion 64A by means of bolts 70.

Hub 64 has a coaxial cylindrical opening 72 in it. Received in cylindrical opening 72 is a second hub 74 having an integral flange portion 74A. The second hub 74 is telescopic with respect to the first hub 64. The second hub 74 has an axial recess 76 which receives a long bolt 78 extending from a tapered nut 80 which in turn is received within a frustro-conical recess 82 formed in first hub 64. Extending between the head of the bolt 78 and second hub 76 is a spring 84 so that the second hub 74 is constantly urged in the direction towards first hub 64.

The cutter wheel 60 is secured to the flange portion 74A of the second hub by means of bolts 86. Thus, it can be seen that wheels 60 and 62 are rotatably supported by the hub carrier 48 and the spacing between the cutter wheels is variable.

Figure 8:
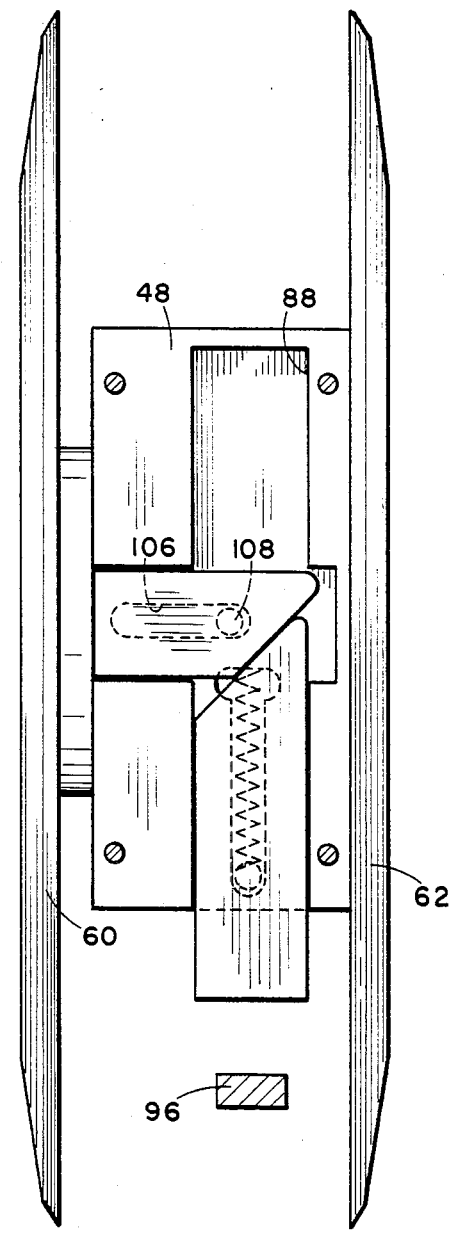
FIG. 8 is a cross-sectional bottom view of the hub and cutter wheels as taken along the line 8—8 of FIG. 3.
Figure 9:
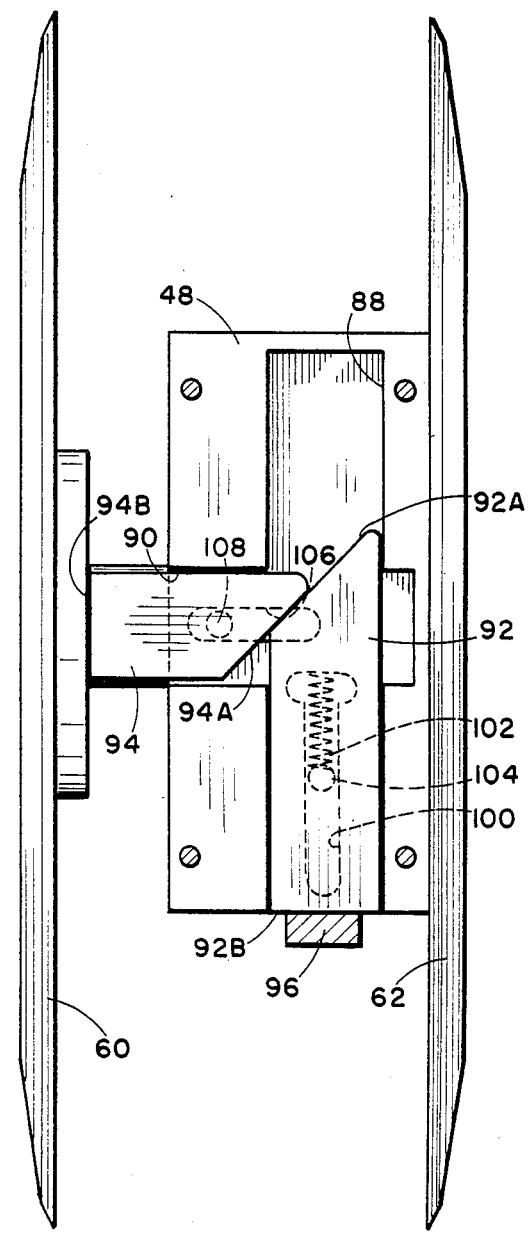
FIG. 9 is a cross-sectional bottom view as in FIG. 8 showing the cutter wheels expanded for a larger width stringer.

FIGS. 8 and 9 show means whereby the spacing between cutter wheels 60 and 62 is adjusted. Formed in the bottom of the hub carrier 48 is a first groove 88, the elongated axis of groove 88 being parallel to the longitudinal axis of the carrier arm 16. Intersecting groove 88 is a second groove, the longitudinal axis of which is perpendicular to the vertical plane of the carrier arm 16. Received in groove 88 is a first follower 92 having a tapered forward end 92A. Received in second groove 90 is a second follower 94 having a tapered forward end 94A. The tapered ends 92A and 94A of the followers are in engagement with each other and slideable relative to each other. First follower 92 has a second end 92B opposite the tapered end and in like manner the second follower 94 has a second end 94B opposite the tapered end. The second follower second end 94B is in engagement with the inside of second hub flange portion 74A, as seen in FIG. 4 and 9.

When the operator is ready to position a pallet stringer 20 on top of support arm 14 he withdraws the hub carrier 48. As it is withdrawn to its inward starting position the second end 92B of the first follower 94 contacts a stationary stop member 96 (See FIGS. 5, 8 and 9) which extends upwardly from the support arm 14. When this happens the first follower 92 is moved inwardly, forcing the second follower 94 outwardly and moving the cutter wheel 92 outwardly, compressing spring 84 (FIG. 4). The operator then adjusts the width of the support arm first and second portions 28 and 30, as previously described, by controlling fluid flow to cylinder 40. The width is adjusted to conform to the width of the stringer on the support arm. The operator then supplies flow pressure to cylinder 56 advancing piston rod 58 to move the cutter wheels toward the pallet supported on the support arm. When the hub support moves forwardly contact with the stop 56 is removed and spring 84 retracts cutter 60. The retraction will continue until the cutter wheel engages the outer edge 34A of the support arm. Thus, the width between the cutter wheels will self-adjust on each operation to the width of the support arm.

Figure 5:
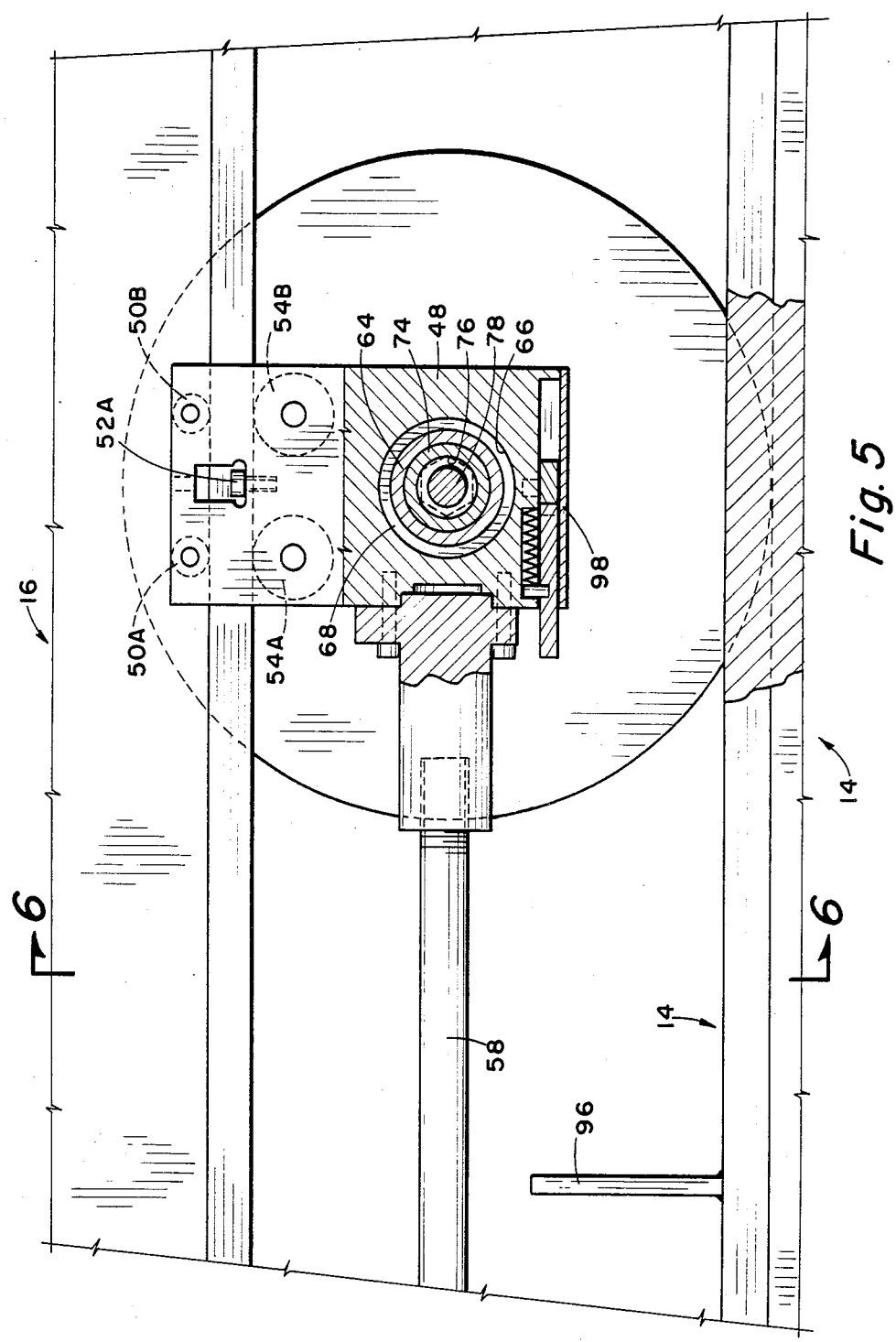
FIG. 5 is a cross-sectional view taken along the line 5—5 of FIG. 3.

FIGS. 8 and 9 are shown with a bottom cover plate 98 as seen is FIGS. 4 and 5, removed. As shown in FIGS. 8 and 9 the first follower 92 has a groove 100 which receives a spring 102 and stop pin 104 so that the follower is always biased towards the forward position. A similar groove 106 is also provided in the second follower 94 to receive a stop pin so that the limit of travel is controlled.

FIGS. 6 and 7 show the machine as used to cut the nails 24 holding deck boards 22 to a stringer 20. The stringer is positioned on the top of the variable width portions 28 and 30 of the support arm 14. FIG. 6 shows a support arm in its retracted position so that the stringer 20 is of the narrowest width to which the machine is designed The first and second support arm portions 28 and 30 are shown provided with cutting strips 110 and 112 which are made of very hard materials to resist wear as they are engaged by the inner portions of the cutting wheels 60 and 62. FIG. 7 shows a top cross-sectional view as the cutters move along on the carrier arm 16, severing the nails holding the deck boards to stringer 20.

As seen in FIG. 1, attached to the outer end of the support arm 14 is a stop member 114. In loading the pallet 18 onto the support arm it is slid over the stop member so that the pallet can not be displaced relative to the arm as the cutter wheels move to cut the nails holding the deck boards to the stringers. Adjacent the inner end of the support arm is a springloaded positioning member 116 which keeps the pallet urged against the stop member 114. When the pallet is loaded on the support arm the user pushes the springloaded position member 116 compressing the spring 118. After the pallet is released on the support arm the spring 118 urges it against the stop member 114 so that the pallet is always in the preferred position before the actuation of the piston rod 58 to move the cutting wheel to cut the nails.

While the invention has been described as being used for disassembly of wood pallets it is understood that such disassembly does not necessarily mean that the complete pallet is taken apart. The machine can be used for partial disassembly such as for removing only one or two damaged or deteriorated stringers for replacement. The term "disassemblying" means complete or partial taking apart the deck boards and stringers of a wood pallet.

The device thus described is the preferred embodiment for practicing the invention at the time of the preparation of this specification and is exemplary of an apparatus for practicing the principles of this invention. It is understood that this invention is not limited to the specific embodiments set forth herein for purposes of exemplification, but is to me limited only by the scope of the attached claim or claims, including the full range of equivalency to which each element thereof is entitled.

What is claims is:

1. A machine for completely or partially disassemblying wood pallets of the type made of paralleled, spaced apart stringers onto which deck boards are retained by nails, the deck boards extending perpendicular to the stringers and being nailed to both sides of the stringers, the assembled pallets providing a bottom support surface of deck boards and a top material receiving surface of deck boards, the machine comprising:
   an elongated support arm onto which a wood pallet is positioned with a stringer in paralleled engagement with the support arm and deck boards extending to either side;
   an elongated carrier arm supported parallel to and spaced from the support arm;
   a hub slideably supported by said carrier arm;
   opposed cutter wheels rotatably supported to said hub, the periphery of the cutter wheels being adjacent the opposed sides of said support arm;
   means on said support arm to restrain a pallet stringer thereon from laterally shifting; and
   means to reciprocably extend said hub and cutter wheels to cut the nails between deck boards and a stringer positioned on said support arm.

2. A pallet disassemblying machine according to claim 1 wherein said support arm is variable in width.

3. A pallet disassemblying machine according to claim 1 wherein said support arm is variable in width and wherein the spacing between said cutter wheels is variable.

4. A pallet disassemblying machine according to claim 1 wherein said means to reciprocably extend said hub and cutter wheels includes a hydraulically actuated cylinder piston.

5. A pallet disassemblying machine according to claim 1 wherein said support arm comprises:
   a first elongated portion having an outer board engaging edge;
   a second elongated portion having an outer board engaging edge, the said engaging edges being opposite and parallel to each other;
   guide members between said support arm first and second portions providing guide paths set at an angle to said support arm first and second portions whereby as said second portion is laterally displaced relative to said first portion the width between said board engaging edges changes; and
   means to selectively vary the lateral displacement of said support arm second portion relative to said support arm first portion.

6. A pallet disassembly machine according to claim 5 wherein said means to vary the lateral displacement of said support arm second portion relative to said first portion includes a hydraulically controllable cylinder piston.

7. A pallet disassembly machine according to claim 1 including:
   a vertical post member, said support arm being affixed at one end thereof to said post member and extending horizontally therefrom, and said carrier arm being affixed at one end thereof to said post member and extending horizontally therefrom above said support arm, said post member, support arm and carrier arm being in a common vertical plane.

8. A machine for completely or partially disassemblying wood pallets of the type made of paralleled, spaced apart stringers onto which deck boards are retained by nails, the deck boards extending perpendicular to the stringers and being nailed to both sides of the stringers the assembled pallets providing a bottom support surface of deck boards and a top material receiving surface of deck boards, the machine comprising:.
   an elongated support arm onto which a wood pallet is positioned with a stringer in paralleled engagement with the support arm and deck boards extending to either side;

means to selectably vary the width of said support arm to substantially correspond to the width of the stringer supported thereon;

an elongated carrier arm supported parallel to and spaced from the support arm;

a hub slideably supported by said carrier arm;

opposed cutter wheels rotatably supported to said hub, the periphery of the cutter wheels being adjacent the opposed sides of said support arm;

means to vary the spacing between said cutter wheels to substantially correspond to the width of said support arm;

means on said support arm to restrain a pallet stringer thereon from laterally shifting; and means to reciprocably extend said hub and cutter wheels to cut the nails between deck boards and a stringer positioned on said support arm.

9. A pallet disassemblying machine according to claim 8 wherein said means to reciprocably extend said hub and cutter wheels includes a hydraulically actuated cylinder piston.

10. A pallet disassemblying machine according to claim 8 wherein said support arm comprises:

a first elongated portion having an outer board engaging edge;

a second elongated portion having an outer board engaging edge, the said engaging edges being opposite and parallel each other;

guide members between said support arm first and second portions providing guide paths set at an angle to the longitudinal axis of said support arm first and second portions whereby as said second portion is laterally displaced relative to said first portion the width between said board engaging edges changes; and means to selectively vary the lateral displacement of said support arm second portion relative to said support arm first portion to thereby provide said means to selectably vary the width of said support arm.

11. A pallet disassembly machine according to claim 10 wherein said means to vary the lateral displacement of said support arm second portion relative to said first portion includes a hydraulically controllable cylinder-piston.

12. A pallet disassembly machine according to claim 8 including:

a vertical post member, said support arm being affixed at one end thereof to said post member and extending horizontally therefrom, and said carrier arm being affixed at one end thereof to said post member and extending horizontally therefrom above said support arm, said post member, support arm and carrier arm being in a common vertical plane.

13. A pallet disaseembly machine according to claim 8 wherein said opposed cutter wheels are resiliently biased to move towards each other and to engage the opposed sides of said support arm wherein the spacing between said cutter wheels is automatically determined by the width of said support arm.

* * * * *